(12) United States Patent
Banno

(10) Patent No.: US 10,086,863 B2
(45) Date of Patent: Oct. 2, 2018

(54) STEERING WHEEL

(71) Applicant: TOYODA GOSEI CO., LTD., Kiyosu-shi, Aichi-ken (JP)

(72) Inventor: Yoshiteru Banno, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/609,174

(22) Filed: May 31, 2017

(65) Prior Publication Data

US 2017/0349202 A1    Dec. 7, 2017

(30) Foreign Application Priority Data

Jun. 3, 2016  (JP) .................................. 2016-111937

(51) Int. Cl.
 *B62D 1/08* (2006.01)
 *B62D 1/04* (2006.01)

(52) U.S. Cl.
 CPC ...... *B62D 1/08* (2013.01); *B62D 1/04* (2013.01)

(58) Field of Classification Search
 CPC ..................................... B62D 1/04; B62D 1/08
 See application file for complete search history.

(56) References Cited

U.S. PATENT DOCUMENTS

| 2,081,729 A | * | 5/1937 | Beck | B62D 1/08 |
| | | | | 74/552 |
| 2,197,317 A | * | 4/1940 | Ratner | B62D 1/08 |
| | | | | 74/552 |
| 6,079,736 A | * | 6/2000 | Koide | B60R 21/2035 |
| | | | | 280/728.2 |

FOREIGN PATENT DOCUMENTS

| GB | 434231 A | * | 8/1935 | ............... B62D 1/04 |
| GB | 943432 A | * | 12/1963 | ............... B62D 1/08 |
| JP | 53-56638 | | 10/1978 | |
| JP | 2014-094727 A | | 5/2014 | |

\* cited by examiner

*Primary Examiner* — Thomas C Diaz
(74) *Attorney, Agent, or Firm* — Posz Law Group, PLC

(57) ABSTRACT

A steering wheel includes: a boss part; a ring part that is located at an outer circumferential side of the boss part; a plurality of spoke parts that connect the boss part and the ring part; and a core including: a core boss part; a core ring part that is located at an outer circumferential side of the core boss part; and core spoke parts that connect the core boss part and the core ring part, wherein: the plurality of spoke parts include true spoke parts having the core spoke parts, and a pseudo spoke part that does not have the core spoke parts; and the pseudo spoke part is mounted on the core ring part, and includes a separate retaining member that retains a shape of the pseudo spoke part.

7 Claims, 6 Drawing Sheets

STEERING WHEEL

CROSS-REFERENCE TO RELATED APPLICATION(S)

This application is based upon and claims the benefit of priority from Japanese Patent Application No. 2016-111937, filed on Jun. 3, 2016, the entire contents of which are incorporated herein by reference.

BACKGROUND

1. Field of the Invention

The present invention relates to a steering wheel provided with a boss part, a ring part located at an outer circumferential side of the boss part, and a plurality of spoke parts connecting the boss part and the ring part.

2. Description of the Related Art

In the related arts, a core is installed in a steering wheel. This core has a core boss part, a core ring part that is located at an outer circumferential side of the core boss part, and core spoke parts that connect the core boss part and the core ring part. The core ring part is covered by a covering member formed of polyurethane.

A steering wheel described in JP-UM-A-S53-56638 has three spoke parts, two of which serve as true spoke parts having the core spoke parts, and the remaining one of which serves as a pseudo spoke part that does not have the core spoke parts. Upper and lower surfaces of the spoke parts are formed by upper and lower surface covers. Outer circumferential ends of these covers at a portion at which the pseudo spoke part is formed are connected to a protruding piece projected from the core ring part toward an inner circumferential side in a contact state using screws. According to this steering wheel, the pseudo spoke part is provided, and thus the number of core spoke parts can be reduced, and the steering wheel can be made light. Since the outer circumferential ends of the upper and lower surface covers are connected to the projecting piece via the screws, these covers can be reliably fixed, and the shape of the pseudo spoke part is favorably retained.

Meanwhile, the steering wheel has the spoke parts, the number of which is four or two. When the number of spoke parts is four and three, positions at which the pseudo spoke part is formed are different. When the number of spoke parts is two, the pseudo spoke part is not formed. In the core of the steering wheel described in JP-UM-A-S53-56638, the protruding piece is integrally formed with the core ring part, and protrudes to the inner circumferential side. For this reason, the core cannot be shared between the case in which the number of spoke parts is four and the case in which the number of spoke parts is three.

SUMMARY

An object of the present invention is to provide a steering wheel capable of improving retainability of a shape of a pseudo spoke part and sharing a core.

According to an aspect of the present invention, there is provided a steering wheel including: a boss part; a ring part that is located at an outer circumferential side of the boss part; a plurality of spoke parts that connect the boss part and the ring part; and a core including: a core boss part; a core ring part that is located at an outer circumferential side of the core boss part; and core spoke parts that connect the core boss part and the core ring part, wherein: the plurality of spoke parts include true spoke parts including the core spoke parts, and a pseudo spoke part that does not include the core spoke parts; and the pseudo spoke part is mounted on the core ring part, and has a separate retaining member that retains a shape of the pseudo spoke part.

According to the above configuration, the shape of the pseudo spoke part is retained by the retaining member. For this reason, retainability of the shape of the pseudo spoke part can be improved. Since the retaining member is independent of the core ring part, the retaining member can share the core with, for example, another steering wheel that has a different design and does not include the pseudo spoke part. Therefore, the retainability of the shape of the pseudo spoke part can be improved, and the core can be shared.

In the steering wheel of the present invention, a plurality of mounting parts for mounting the retaining member may be provided in the core ring part, and be spaced apart from one another.

According to the above configuration, the mounting parts for mounting the retaining member are changed, and thus a position at which the pseudo spoke part is formed can be changed. In addition, the number of pseudo spoke part can be changed. Therefore, the core can be shared with a steering wheel in which the pseudo spoke part is different in position or number.

In the steering wheel of the present invention, through-holes for mounting the retaining member may be formed in the core ring part, and the retaining member may include fitting parts fitted into the through-holes.

According to the above configuration, the retaining member can be easily mounted on the core ring part.

In the steering wheel of the present invention, the retaining member may be covered by a covering member formed of a softer resin material than the retaining member, and the covering member may be filled inside the through-holes.

According to the above configuration, since the covering member covering the retaining member is filled inside the through-holes of the core ring part, the retaining member is fixed to the through-holes. Therefore, the retainability of the shape of the pseudo spoke part can be further improved.

In the steering wheel of the present invention, the retaining member may include a pair of fitting parts fitted into the pair of through-holes.

For example, when the through-holes have circular cross-sectional shapes and the retaining member has only one fitting part, in a state in which the fitting part is fitted into the through-hole in manufacturing the steering wheel, the retaining member swings about the through-hole so that positional deviation occurs easily.

In this regard, according to the above configuration, since the pair of fitting parts of the retaining member are respectively fitted into the pair of through-holes of the core ring part, the swing of the retaining member around one of the through-holes is hindered by the fitting part fitted into the other through-hole. For this reason, the positional deviation of the retaining member from the core can be hindered, and positioning of the retaining member with respect to the core can be easily performed.

In the steering wheel of the present invention, the retaining member may be covered by a covering member formed of a softer resin material than the retaining member, the pseudo spoke part may include a plurality of covers, and the plurality of covers may be engaged with the covering member.

According to the above configuration, relative displacement between the retaining member and the cover is absorbed by elastic deformation of the covering member. Therefore, occurrence of backlash of the cover can be inhibited.

In the steering wheel of the present invention, an inner surface of at least one of the plurality of covers may be provided with a first engaging part that is engaged with a surface of the covering member which is opposite to the cover and restricts movement of the cover in a direction in which the cover is separated from the covering member, and a second engaging part that is engaged with a surface of the covering member which faces the inner surface of the cover and restricts movement of the cover in a direction in which the cover approaches the covering member.

According to the above configuration, the first engaging part and the second engaging part are engaged with the covering member, and thus positioning of the cover with respect to the covering member is done. Therefore, the occurrence of the backlash of the cover can be effectively inhibited.

In the steering wheel of the present invention, an insertion hole may be formed in the retaining member, a covering hole for covering an inner circumferential surface of the insertion hole may be formed in covering member, and a protrusion fitted into the covering hole may be formed in the at least one of the plurality of covers.

According to the above configuration, shape retainability of an inner circumferential surface of the covering hole is enhanced by the retaining member. Since the protrusion of the cover is fitted into this covering hole, the occurrence of the backlash of the cover can be effectively inhibited.

According to the present invention, the retainability of the shape of the pseudo spoke part can be improved, and the core can be shared.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 6A and 6B are views illustrating mainly the retaining member mounted on the core of the embodiment, wherein FIG. 6A is a perspective view shown from a front side, and FIG. 6B is a perspective view shown from a rear side:

DETAILED DESCRIPTION OF THE INVENTION

An embodiment of a steering wheel will be described with reference to FIGS. 1A to 10.

Figure 1B:
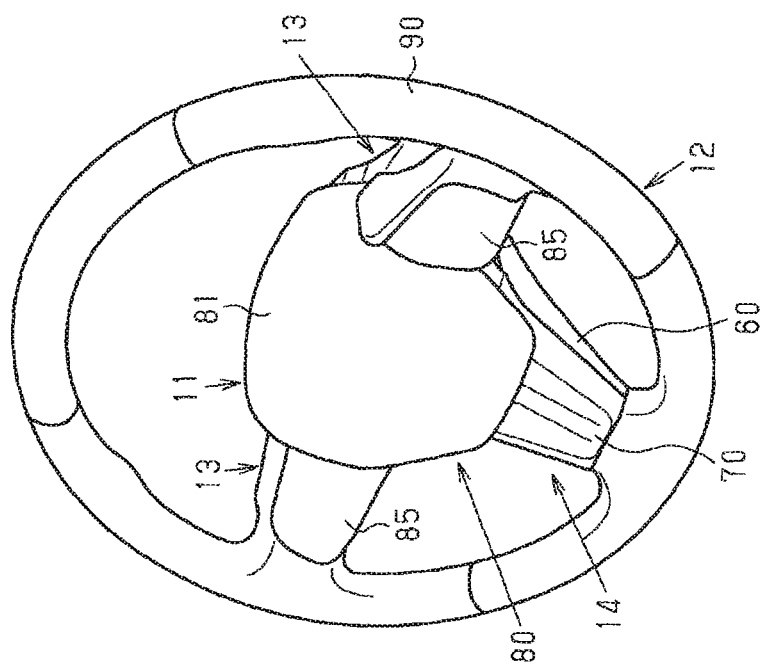
FIG. 1B is a perspective view illustrating the steering wheel.
Figure 1A:
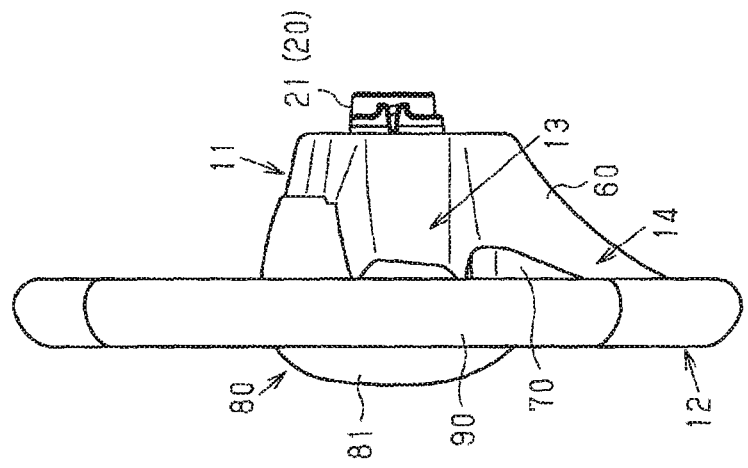
FIG. 1A is a side view illustrating an embodiment of a steering wheel.

As illustrated in FIGS. 1A and 1B, the steering wheel is used to steer a vehicle, and is provided with a boss part 11, a ring part 12 that is located at an outer circumferential side of the boss part 11 and is grasped during steering, and a plurality of spoke parts 13 and 14 that connect the boss part 11 and the ring part 12. The plurality of spoke parts 13 and 14 are made up of a pair of true spoke parts 13 that extend from the boss part 11 in directions opposite to each other (in leftward and rightward directions in FIG. 1B), and one pseudo spoke part 14 that extends downward from the boss part 11.

Figure 4:
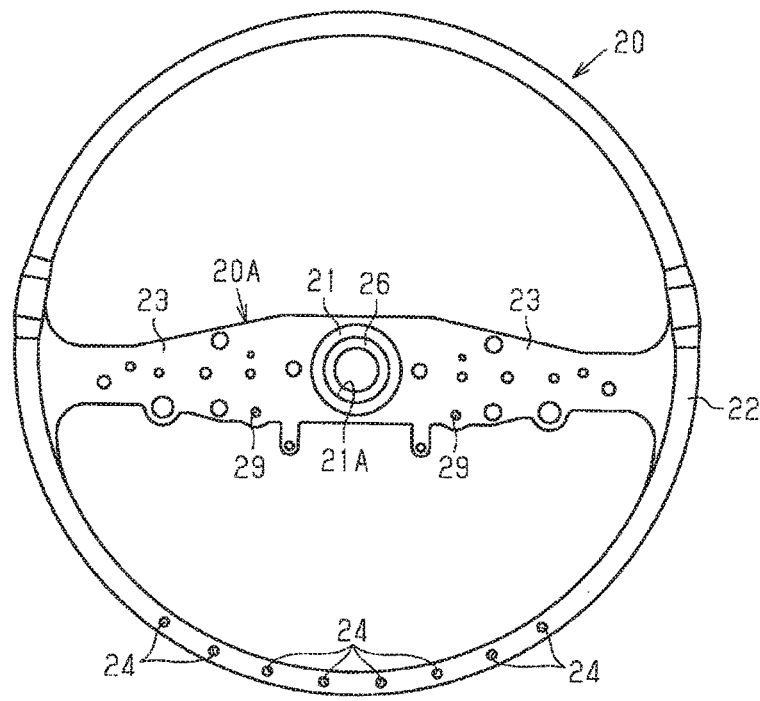
FIG. 4 is a top view of a core of the embodiment.
Figure 5:
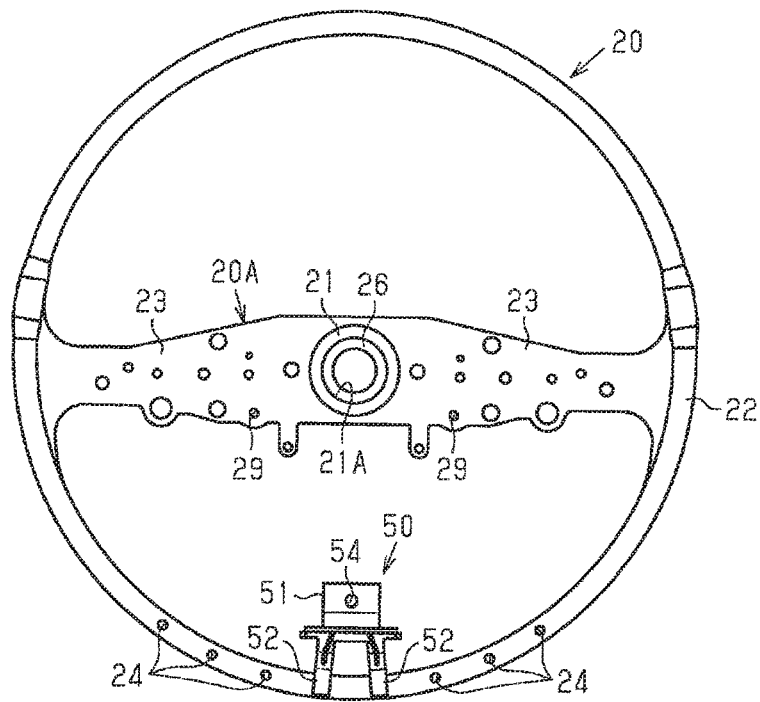
FIG. 5 is a top view illustrating a state in which a retaining member is mounted on the core of the embodiment.

As illustrated in FIGS. 4 and 5, a core 20 is provided with a core boss part 21 that has a center hole 21A, a core ring part 22 that is located at an outer circumferential side of the core boss part 21, and a core main body 20A that has a pair of left and right core spoke parts 23 connecting the core boss part 21 and the core ring part 22. The core spoke parts 23 are provided in the true spoke parts 13, but the core spoke parts 23 are not provided in the pseudo spoke part 14.

A fastening tubular part 26 formed of a steel material or the like is provided inside the center hole 21A of the core boss part 21. The fastening tubular part 26 is inserted around a steering shaft (not shown), and thus the steering wheel is assembled to the steering shaft.

The pair of core spoke parts 23 extend from the core boss part 21 in directions opposite to each other (in leftward and rightward directions in the same figure).

Figure 8:
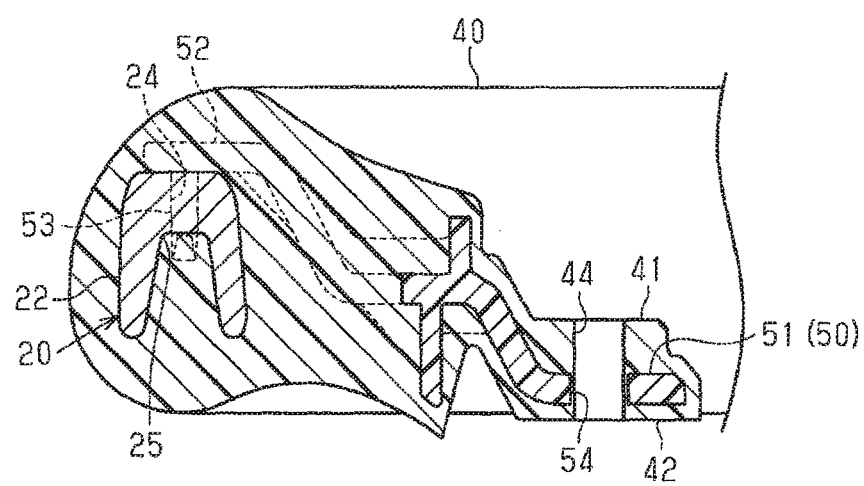
FIG. 8 is a sectional view illustrating a sectional structure taken along line 8-8 of FIG. 7.

As illustrated in FIG. 8, a groove 25 extends at a rear side of the core ring part 22 in a circumferential direction.

As illustrated in FIG. 4, a plurality of through-holes 24 passing through the front and rear are formed at a lower portion of the core ring part 22 at regular intervals in a circumferential direction. In present embodiment, eight through-holes 24 are formed within a range from a middle position between a 4 o'clock position and a 5 o'clock position to a middle position between a 7 o'clock position and an 8 o'clock position.

As illustrated in FIG. 5, a retaining member 50 formed of a hard resin material is mounted on a pair of through-holes 24 that are located in the middle among the eight through-holes 24.

Figure 6B:
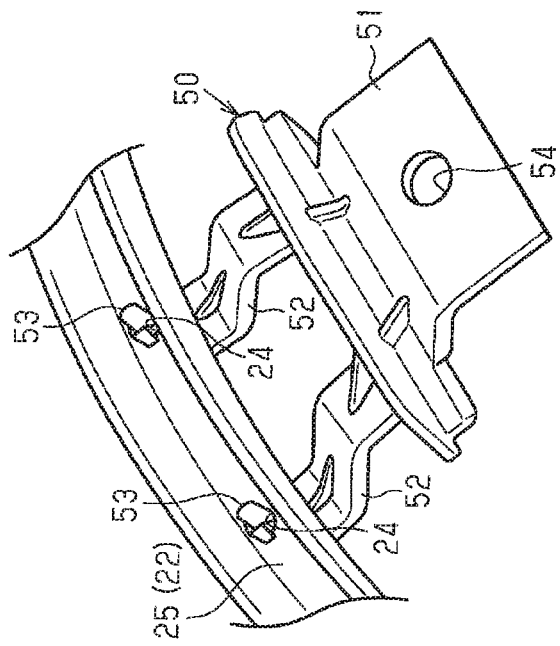
Figure 6A:
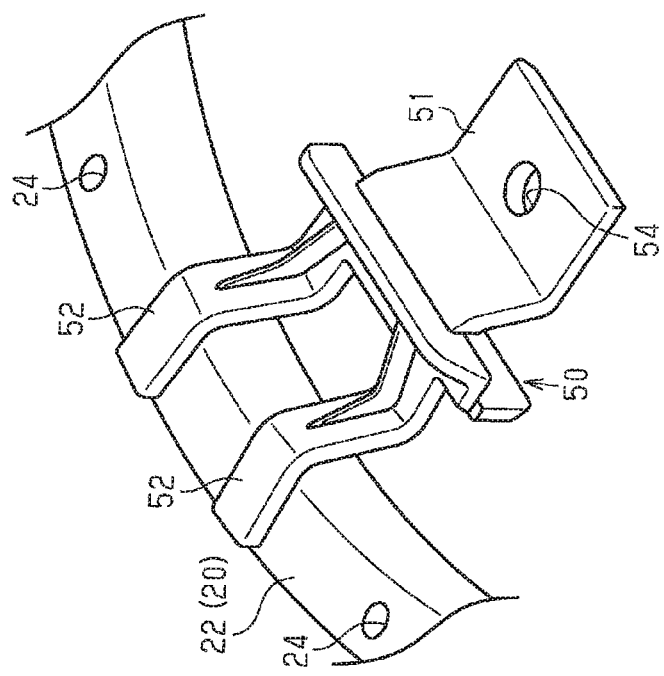

As illustrated in FIGS. 6A, 6B, and 8, the retaining member 50 has a pair of fitting parts 53 that are respectively fitted into the pair of through-holes 24 from a front side, a pair of leg parts 52 that extend from the respective fitting parts 53 toward an inner circumferential side, and a main body part 51 to which the pair of leg parts 52 are connected, and is integrally formed by injection molding. An insertion hole 54 passing through the front and rear is formed in the main body part 51.

Figure 7:
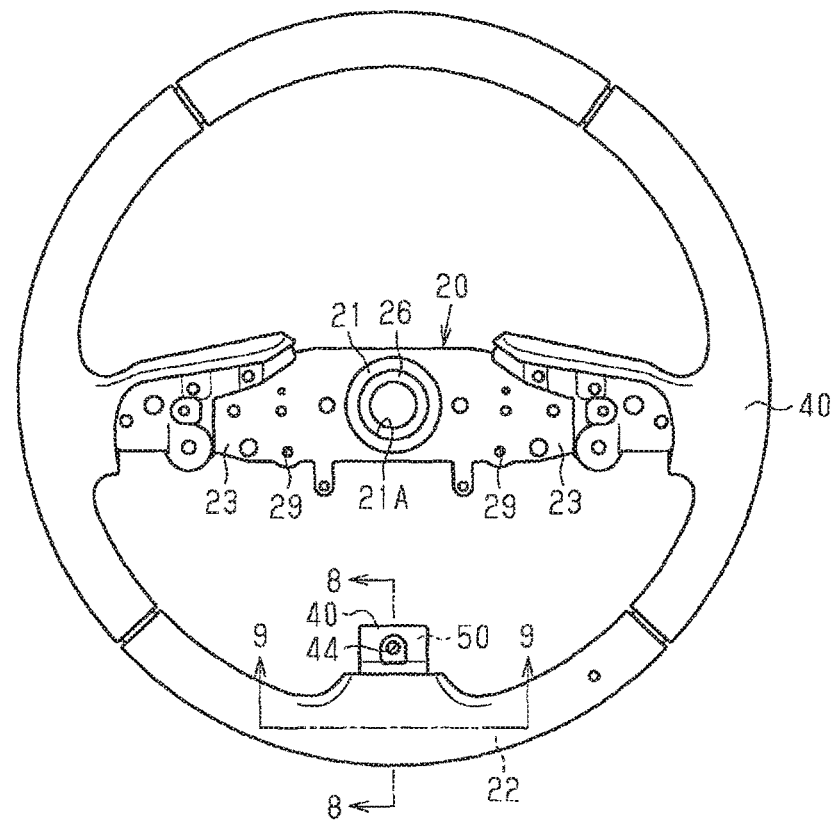
FIG. 7 is a top view illustrating a state in which the assembly illustrated in FIG. 5 is covered by a covering member.

As illustrated in FIG. 7, the core ring part 22 and the retaining member 50 are covered over all by a covering member 40 formed of polyurethane. The covering member 40 also covers a region including portions at which the core spoke parts 23 are connected with the core ring part 22. That is, in a state in which the core 20 and the retaining member 50 are inserted in a forming mold (not shown), a stock solution of polyurethane is injected into and molded in the same mold, and thus the polyurethane is integrally formed around the core 20 and the retaining member 50.

Figure 9:
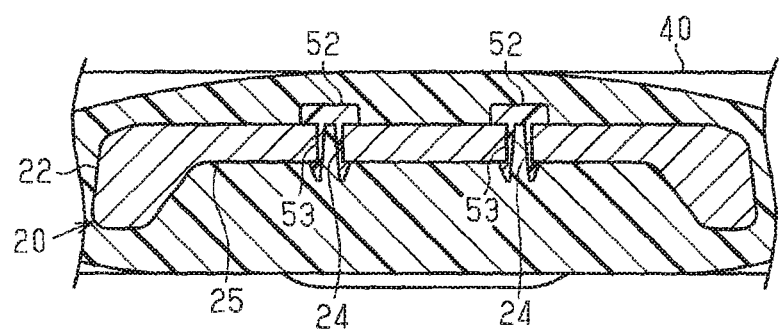
FIG. 9 is a sectional view illustrating a sectional structure taken along line 9-9 of FIG. 7.

As illustrated in FIG. 8, the covering member 40 is filled in the groove 25 of the core ring part 22. As illustrated in FIG. 9, the covering member 40 is filled in the through-holes 24 of the core ring part 22. The fitting parts 53 are fixed to the through-holes 24 via the covering member 40 filled in this way. Thereby, the retaining member 50 is fixed to the core ring part 22.

A covering hole 44 for covering an inner circumferential surface of the insertion hole 54 of the retaining member 50 is formed in the covering member 40.

Figure 10:
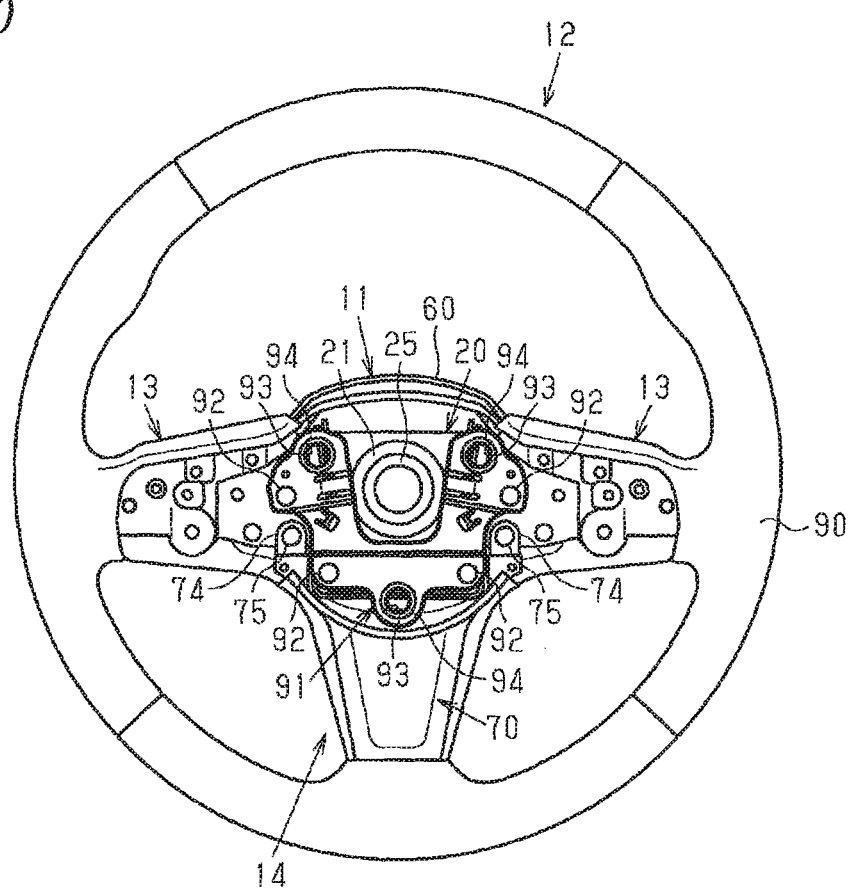
FIG. 10 is a top view illustrating a state in which a skin material and a plate for mounting the front cover, a rear cover, and an airbag device are mounted on the assembly illustrated in FIG. 7.

As illustrated in FIGS. 1A, 1B and 10, a skin material 90 is wrapped around an outer circumferential surface and the like of the covering member 40 covering the core ring part 22.

As illustrated in FIGS. 1A and 1B, a rear cover 60 forming rear surfaces of the boss part 11 and the spoke parts 13 and 14 is mounted at rear sides of the core boss part 21 and the core spoke parts 23.

Figure 2:
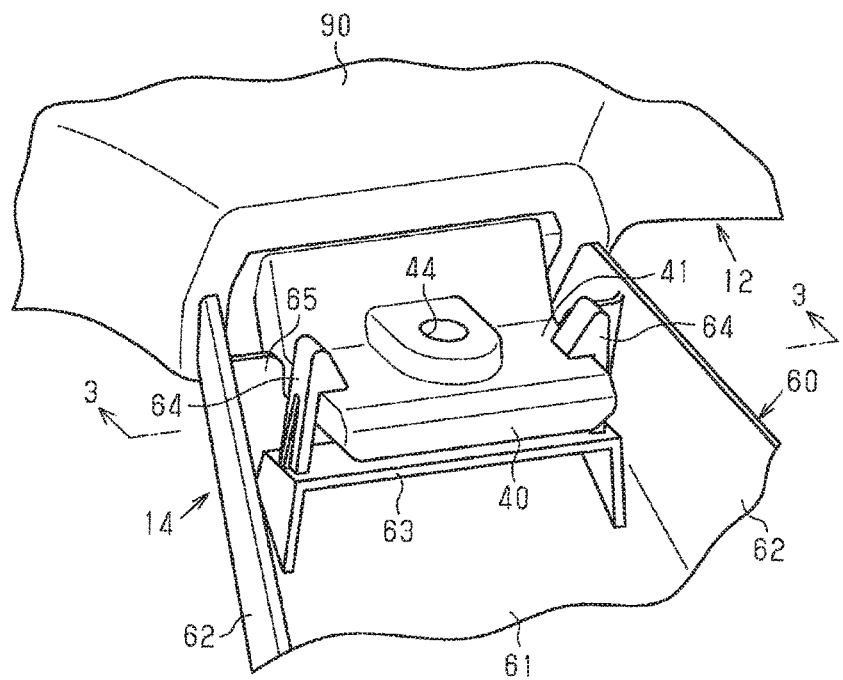
FIG. 2 is a perspective view illustrating mainly a connecting portion between a ring part and a pseudo spoke part in a state in which a front cover is not mounted with respect to the steering wheel of the embodiment from an inner circumferential side.
Figure 3:
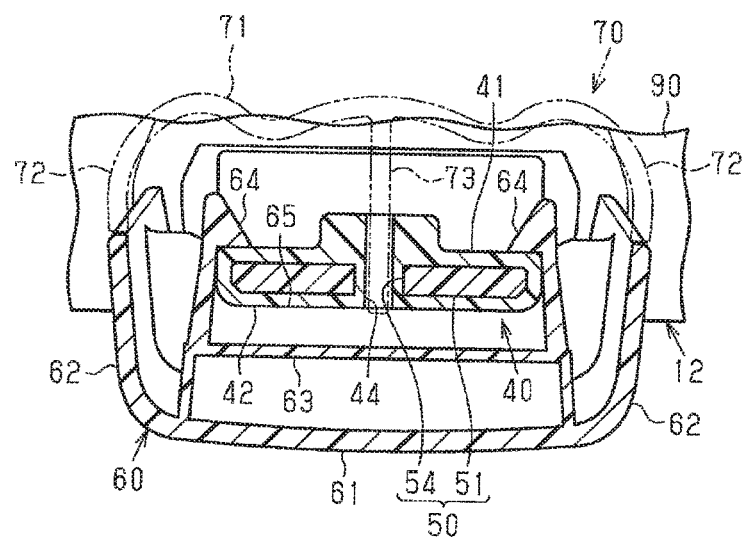
FIG. 3 is a sectional view illustrating a sectional structure taken along line 3-3 of FIG. 2.

As illustrated in FIGS. 2 and 3, the rear cover 60 has a bottom wall 61 that forms a rear surface of the pseudo spoke part 14, and sidewalls 62 that are bent from widthwise both ends of the bottom wall 61 and extend to a front side.

A base 63 is projected from an inner surface of the bottom wall 61. A pair of engaging claw parts 64 engaged with a front surface 41 of a portion (hereinafter the covering member 40) covering the retaining member 50 at the covering member 40 are projected from widthwise both ends of the base 63. The pair of engaging claw parts 64 are engaged with the front surface 41 of the covering member 40, thereby restricting movement of the rear cover 60 in a direction in which the rear cover 60 is separated from the covering member 40th.

An engaging wall part 65 coming into contact with a rear surface of the covering member 40 is projected from inner surfaces of the bottom wall 61 and the opposite sidewalls 62. The engaging wall part 65 is brought into contact with the rear surface 42 of the covering member 40, thereby restricting movement of the rear cover 60 in a direction in which the rear cover 60 approaches the covering member 40.

As illustrated in FIGS. 1A and 1B, a front cover 70 forming the pseudo spoke part 14 is mounted at a front side of the covering member 40 covering the retaining member 50.

As illustrated in FIG. 3 with a two-dot chain line, the front cover 70 has a top wall 71 and sidewalls 72 that are bent from widthwise both ends of the top wall 71 and extend toward a rear side. A protrusion 73, which has a columnar shape and is fitted into the covering hole 44 of the covering member 40, is formed on an inner surface of the top wall 71.

As illustrated in FIG. 10, a pair of left and right mounting pieces 74 are formed at an end of the front cover 70 which is close to the boss part 11. Screws 75 are inserted into insertion holes (not shown) of the mounting pieces 74, and are screwed into threaded holes 29 of the core 20 (see FIG. 4 or the like), whereby the end of the front cover 70 is fixed to the core 20.

A pair of bezels 85 forming front surfaces of the true spoke parts 13 are mounted at front sides of the pair of core spoke parts 23.

A pad 81 constituting an airbag device 80 for a driver's seat is mounted on the boss part 11.

As illustrated in FIG. 10, a plate 91 having an approximate U shape in a front view is mounted on the core spoke parts 23 by a plurality of screws 92. Three mounting holes 93 are formed in the plate 91, and are spaced apart from one another. Holding tubular parts 94 are inserted into and mounted in the mounting holes 93. Horn switch mechanisms (not shown) that constitute the airbag device 80 and are operated by a pressing operation against the pad 81 (see FIG. 1) are inserted into and engaged with interiors of the respective holding tubular parts 94. Thus, the airbag device 80 is mounted on the core 20 via the plate 91.

According to the steering wheel of the present embodiment described above, operation and effects shown below can be obtained.

(1) The plurality of spoke parts 13 and 14 of the steering wheel include the true spoke parts 13 having the core spoke parts 23, and the pseudo spoke part 14 that does not have the core spoke parts 23. The pseudo spoke part 14 is mounted on the core ring part 22, and includes the separate retaining member 50 that retains the shape of the pseudo spoke part 14.

According to this configuration, the shape of the pseudo spoke part 14 is retained by the retaining member 50. For this reason, retainability of the shape of the pseudo spoke part 14 can be improved. Since the retaining member 50 is independent of the core ring part 22, the retaining member 50 can share the core 20 with, for example, another steering wheel that has a different design and does not have the pseudo spoke part 14. Therefore, the retainability of the shape of the pseudo spoke part 14 can be improved, and the core 20 can be shared.

(2) The plurality of through-holes 24 acting as mounting parts for mounting the retaining member 50 are provided in the core ring part 22 and are spaced apart from one another in a circumferential direction.

According to this configuration, the through-holes 24 for mounting the retaining member 50 are changed, so that a position at which the pseudo spoke part 14 is formed can be changed. In addition, the number of pseudo spoke part 14 can be changed. Therefore, the core 20 can be shared with a steering wheel in which the pseudo spoke part 14 is different in position or number.

(3) The retaining member 50 has the fitting parts 53 fitted into the through-holes 24. For this reason, the retaining member 50 can be easily mounted on the core ring part 22.

(4) The retaining member 50 is covered by the covering member 40 formed of a softer resin material than the retaining member 50. The covering member 40 is filled inside the through-holes 24.

According to this configuration, since the covering member 40 covering the retaining member 50 is filled inside the through-holes 24 of the core ring part 22, the retaining member 50 is fixed to the through-holes 24. Therefore, the retainability of the shape of the pseudo spoke part 14 can be further improved.

(5) The retaining member 50 has the pair of fitting parts 53 that are respectively fitted into the pair of through-holes 24.

For example, when the through-holes 24 have circular cross-sectional shapes and the retaining member 50 has only one fitting part 53, in a state in which the fitting part 53 is fitted into the through-hole 24 in manufacturing the steering wheel, the retaining member 50 swings about the through-hole 24 so that positional deviation occurs easily.

In this regard, according to the above configuration, since the pair of fitting parts 53 of the retaining member 50 are respectively fitted into the pair of through-holes 24 of the core ring part 22, the swing of the retaining member 50 around one of the through-holes 24 is hindered by the fitting part 53 fitted into the other through-hole 24. For this reason, the positional deviation of the retaining member 50 from the core 20 can be hindered, and positioning of the retaining member 50 with respect to the core 20 can be easily performed.

(6) The pseudo spoke part 14 is covered from the front and rear thereof by the covers 60 and 70, and the covers 60 and 70 are engaged with the covering member 40.

According to this configuration, relative displacement between the retaining member 50 and the covers 60 and 70 is absorbed by elastic deformation of the covering member 40. Therefore, occurrence of backlash of the covers 60 and 70 can be inhibited.

(7) The engaging claw parts 64, which are engaged with the front surface 41 of the covering member 40 and restrict the movement of the rear cover 60 in the direction in which the rear cover 60 is separated from the covering member 40, and the engaging wall part 65, which is engaged with the rear surface 42 of the covering member 40 and restrict the movement of the rear cover 60 in the direction in which the rear cover 60 approaches the covering member 40, are provided on the inner surface of the rear cover 60.

According to this configuration, the engaging claw parts 64 and the engaging wall part 65 are engaged with the covering member 40, and thus positioning of the rear cover 60 with respect to the covering member 40 is done. Therefore, the occurrence of the backlash of the rear cover 60 can be effectively inhibited.

(8) The insertion hole 54 is formed in the retaining member 50. The covering hole 44 for covering the inner circumferential surface of the insertion hole 54 is formed in the covering member 40. The protrusion 73 fitted into the covering hole 44 is formed at the front cover 70.

According to this configuration, shape retainability of an inner circumferential surface of the covering hole 44 is enhanced by the retaining member 50. Since the protrusion 73 of the front cover 70 is fitted into this covering hole 44, the occurrence of the backlash of the front cover 70 can be effectively inhibited.

<Modification>

The above embodiment can be changed, for example, as follows.

An engaged state of the rear cover 60 and the front cover 70 with respect to the covering member 40 can be inverted. That is, the protrusion 73 fitted into the covering hole 44 may be provided on the inner surface of the rear cover 60. In this case, the engaging claw parts 64 or the engaging wall part 65 have only to be provided on the inner surface of the front cover 70.

The retaining member 50 may not be covered by the covering member 40. That is, the rear cover 60 or the front cover 70 may be directly engaged with the retaining member 50.

The number of fitting parts 53 may be set to one.

A resin material different from that of the covering member 40 may be filled inside the through-holes 24. Alternatively, the resin material may not be filled inside the through-holes 24.

A protrusion may be formed at the core ring part 22, and a hole into which the same protrusion is fitted may be formed in the retaining member 50.

The mounting parts such as the through-holes 24 of the core ring part 22 may be provided at uneven intervals in a circumferential direction. The number of mounting parts may be set to one.

What is claimed is:

1. A steering wheel comprising:
a boss part;
a ring part that is located at an outer circumferential side of the boss part;
a plurality of spoke parts that connect the boss part and the ring part; and
a core comprising:
   a core boss part;
   a core ring part that is located at an outer circumferential side of the core boss part; and
   core spoke parts that connect the core boss part and the core ring part, wherein:
the plurality of spoke parts include true spoke parts having the core spoke parts, and a pseudo spoke part that does not have the core spoke parts;
the pseudo spoke part is mounted on the core ring part, and includes a separate retaining member that retains a shape of the pseudo spoke part;
through-holes for mounting the retaining member are formed in the core ring part; and
the retaining member includes fitting parts fitted into the through-holes.

2. The steering wheel according to claim 1, wherein a plurality of mounting parts for mounting the retaining member are provided in the core ring part, and are spaced apart from one another.

3. The steering wheel according to claim 1, wherein:
the retaining member is made of a first resin material;
the retaining member is covered by a covering member formed of a second resin material that is softer than the first resin material; and
the covering member is filled inside the through-holes.

4. The steering wheel according to claim 1, wherein the retaining member includes a pair of fitting parts fitted into the pair of through-holes.

5. The steering wheel according to claim 1, wherein:
the retaining member is made of a first resin material;
the retaining member is covered by a covering member formed of a second resin material that is softer than the first resin material;
the pseudo spoke part includes a plurality of covers; and
the plurality of covers are engaged with the covering member.

6. A steering wheel comprising:
a boss part;
a ring part that is located at an outer circumferential side of the boss part;
a plurality of spoke parts that connect the boss part and the ring part; and
a core comprising:
   a core boss part;
   a core ring part that is located at an outer circumferential side of the core boss part; and
   core spoke parts that connect the core boss part and the core ring part, wherein:
the plurality of spoke parts include true spoke parts having the core spoke parts, and a pseudo spoke part that does not have the core spoke parts;
the pseudo spoke part is mounted on the core ring part, and includes a separate retaining member that retains a shape of the pseudo spoke part;
the retaining member is made of a first resin material;
the retaining member is covered by a covering member formed of a second resin material that is softer than the first resin material;
the pseudo spoke part includes a plurality of covers;

the plurality of covers are engaged with the covering member; and an inner surface of at least one of the plurality of covers is provided with:
- a first engaging part that is engaged with a surface of the covering member which is opposite to the cover and restricts movement of the cover in a direction in which the cover is separated from the covering member; and
- a second engaging part that is engaged with a surface of the covering member which faces the inner surface of the cover and restricts movement of the cover in a direction in which the cover approaches the covering member.

7. A steering wheel comprising:
a boss part;
a ring part that is located at an outer circumferential side of the boss part;
a plurality of spoke parts that connect the boss part and the ring part; and
a core comprising:
  a core boss part;
  a core ring part that is located at an outer circumferential side of the core boss part; and
  core spoke parts that connect the core boss part and the core ring part, wherein:
the plurality of spoke parts include true spoke parts having the core spoke parts, and a pseudo spoke part that does not have the core spoke parts;
the pseudo spoke part is mounted on the core ring part, and includes a separate retaining member that retains a shape of the pseudo spoke part;
the retaining member is made of a first resin material;
the retaining member is covered by a covering member formed of a second resin material that is softer than the first resin material;
the pseudo spoke part includes a plurality of covers;
the plurality of covers are engaged with the covering member;
an insertion hole is formed in the retaining member;
a covering hole for covering an inner circumferential surface of the insertion hole is formed in covering member; and
a protrusion fitted into the covering hole is formed in the at least one of the plurality of covers.

* * * * *